(No Model.)
W. F. M. RICKETTS.
HARROW.
No. 319,321. Patented June 2, 1885.
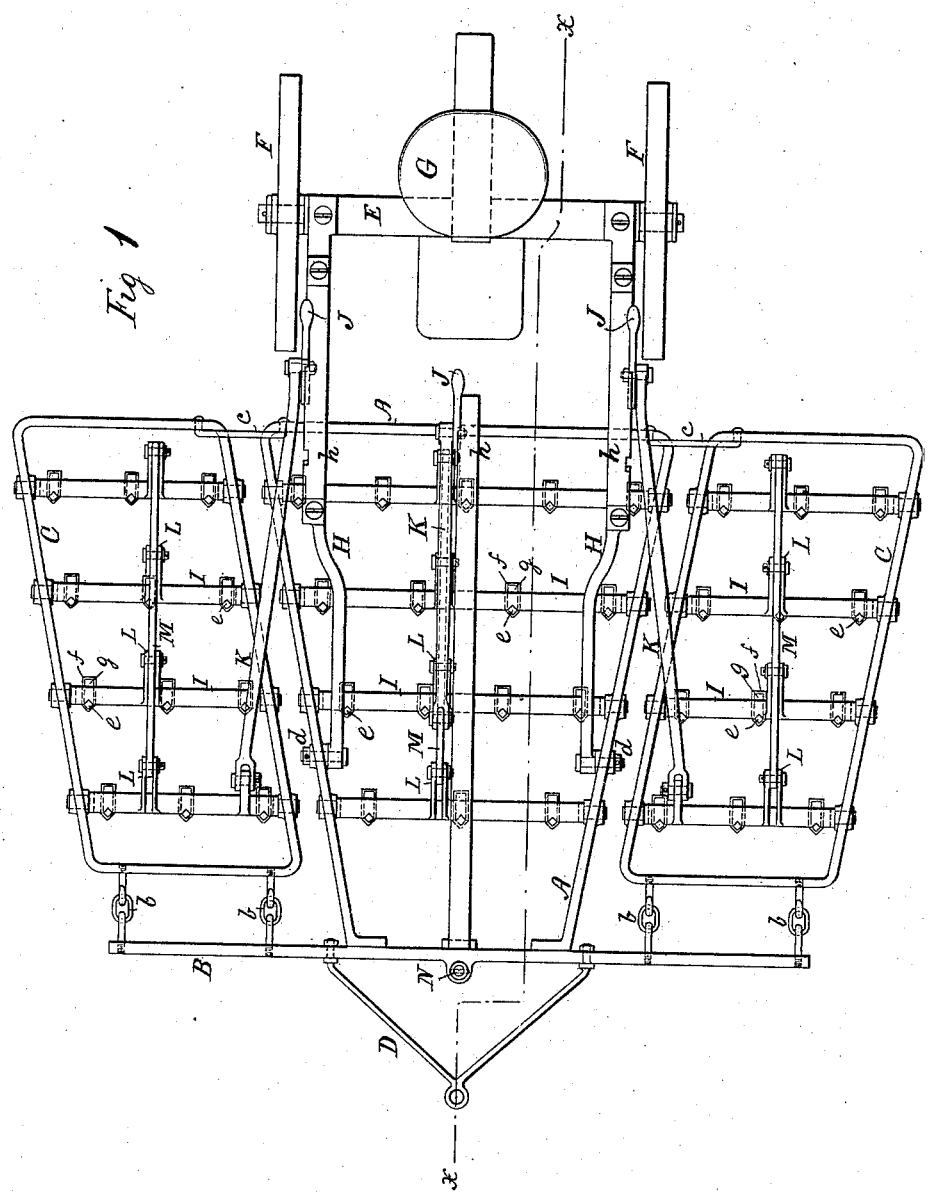
WITNESSES:
John Cook
C. Sedgwick
INVENTOR:
W. F. M. Ricketts
BY Munn & Co
ATTORNEYS.

(No Model.) 2 Sheets—Sheet 2.
W. F. M. RICKETTS.
HARROW.
No. 319,321. Patented June 2, 1885.
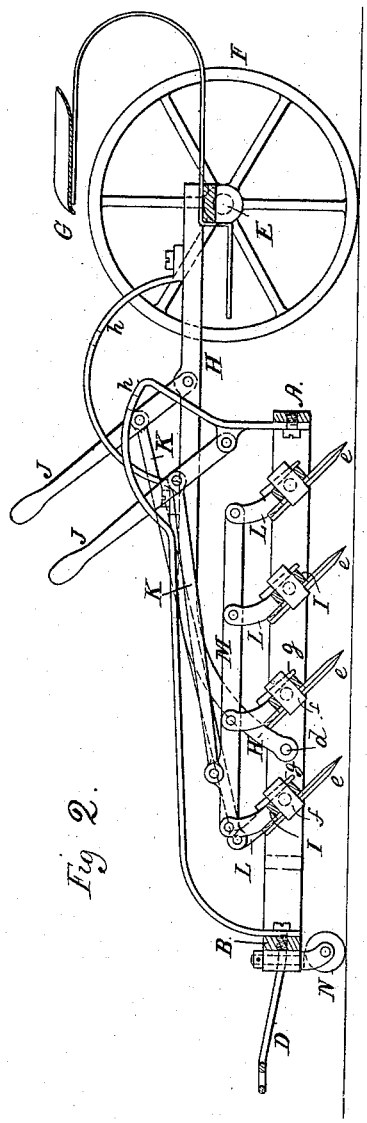
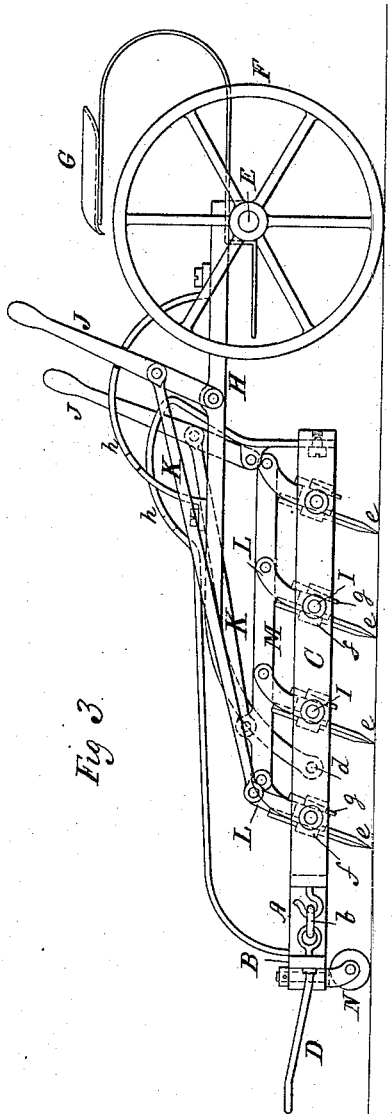
WITNESSES:
John Cook.
C. Sedgwick
INVENTOR:
W. F. M. Ricketts
BY Munn & Co
ATTORNEYS.

UNITED STATES PATENT OFFICE.

WILLIAM F. M. RICKETTS, OF COLTON, WASHINGTON TERRITORY.

HARROW.

SPECIFICATION forming part of Letters Patent No. 319,321, dated June 2, 1885.

Application filed July 28, 1884. (No model.)

*To all whom it may concern:*

Be it known that I, WILLIAM F. M. RICKETTS, of Colton, in the county of Whitman and Territory of Washington, have invented certain new and useful Improvements in Harrows, of which the following is a full, clear, and exact description.

This invention consists in certain novel constructions and combination of parts, substantially as hereinafter described and claimed, for giving increased flexibility to the harrow, and varying at pleasure the angular position of its teeth, with facility for removing and replacing the teeth as required, and for supporting the harrow-frame in front, with or without a sulky attachment in its rear, as hereinafter set forth.

Reference is to be had to the accompanying drawings, forming a part of this specification, in which similar letters of reference indicate corresponding parts in all figures.

Figure 1 represents a top view of a sulky-harrow embodying my invention; Fig. 2, a vertical longitudinal section of the same on the line $x\ x$ in Fig. 1; and Fig. 3 is a side view thereof.

The harrow, as represented in the drawings, is made up of three harrow-sections—that is, a center or main frame and two side frames or wings.

The center or main section, A, is or may be rigidly secured in front to a cross-bar, B, and the side sections, C C, be attached in front thereto by hook-and-link connections $b$, and the several frames be connected to each other in their rear by rods $c$.

D is the hitching rod or device attached to the front of the bar B; E, the axle of the sulky attachment; F F, the wheels thereof in rear of the main frame; G, the driver's seat, and H H the shafts connected at their back ends with the axle and pivoted at their front ends, as at $d\ d$, to the sides of the main frame A.

The harrow-teeth $e\ e$ in each of the frames A C C have bodies of square or angular shape in transverse section. They may be made of any desired size, and by reason of their shape and mode of attachment may be readily taken out and replaced by others when broken, without having special teeth for any particular frame or place. Said teeth are secured to their places in the frames by placing them in front of cross rollers or shafts I, within angular recesses in the front sides thereof, and holding them thereon or therein by clips or clamps $f$, arranged to pass through slots in the shafts or turning bars I, and tightened up by keys or wedges $g$ from the backs of said bars. These bars or shafts I are fitted to turn in the sides of the frames A C C, and are turned or adjusted as required by the driver on his seat by means of hand-levers J, locking in notched supports or guards $h$, and connected by rods K with the turning bars or shafts I, all of which in each frame A C C are connected with each other by crank-arms L and connecting-bars M, so that as either lever J is shifted the several turning bars I throughout the particular frame to which said lever belongs will be turned in their bearings and the harrow-teeth $e$, carried by said bars, be correspondingly moved. In this way or by these means the teeth may be adjusted to any desired angle or slant, the harrow be readily cleaned of all trash, sticks, straw, or other substances that may adhere to it, likewise the implement be made to move easier from place to place without collecting trash or injuring meadow land or grass.

The three sections or frames A C C, with their attached teeth, form, by reason of the loose or jointed connections of the side sections or wings, C C, a flexible harrow, which will readily conform to any unevenness in the surface over which it moves. The middle section is a complete harrow in itself, and it may be provided with a swivel or caster wheel, N, in front, and, if desired, the side wings or sections be released on their outer sides or ends, or be so fitted or attached as to admit of their being folded up on the main section, to facilitate the travel of the harrow over roads, through gates, or from one part of a farm to another; or, again, by slightly modifying the construction, the main section may be removed and the two side sections be brought together, thereby making a very good light harrow, or two harrows out of one.

The implement generally may be made out of wood or iron, and when of metal will be comparatively free from injury by exposure to the weather.

The sulky attachment, while a great acquisition to the implement, may be dispensed with, if desired.

By attaching levers to the connecting-rods in rear, c c, Fig. 1, which connect the outside frames or wings, C C, to the center frame, A, the wings C C may be distended or spread out from the main or center section, and cause the harrow to do better work on hillsides and keep the teeth from following one after the other when the harrow slips to one side; or the same effect may be produced by placing two or more thin knife-like blade-teeth on the rear turning bar or shaft I of the central section, the same being arranged to keep the rear end of the harrow from sliding on hillsides.

Having thus described my invention, I claim as new and desire to secure by Letters Patent—

In a harrow, the central main section, A, having rearwardly-flared sides, and the side or wing sections, C, of oblique rectangular shape, with their rear ends connected to the central section by rods c, and their forward ends connected to a projecting bar, B, of said main section, in combination with the axle E, bearing wheels F, and the shafts H, connected to said axle and pivoted to said main section, the said sections A C having pivoted bars I, provided with teeth and crank-arms, with connecting-rods K and levers J, substantially as and for the purpose set forth.

WILLIAM F. M. RICKETTS.

Witnesses:
 J. B. STANDLEY,
 C. M. WOLFARD.